(12) United States Patent
McKenna et al.

(10) Patent No.: US 10,210,195 B2
(45) Date of Patent: *Feb. 19, 2019

(54) LOCATING DATA IN A SET WITH A SINGLE INDEX USING MULTIPLE PROPERTY VALUES

(71) Applicant: INTERNATIONAL BUSINESS MACHINES CORPORATION, Armonk, NY (US)

(72) Inventors: Patrick J. McKenna, Galway (IE); David P. O'Connor, Galway (IE); Claude N. Warren, Jr., Galway (IE)

(73) Assignee: International Business Machines Corporation, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 15/042,462

(22) Filed: Feb. 12, 2016

(65) Prior Publication Data

US 2017/0235775 A1 Aug. 17, 2017

(51) Int. Cl.
*G06F 17/30* (2006.01)

(52) U.S. Cl.
CPC .......... *G06F 17/3033* (2013.01); *G06F 17/30* (2013.01); *G06F 17/30345* (2013.01); *G06F 17/30424* (2013.01); *G06F 17/30598* (2013.01)

(58) Field of Classification Search
CPC .......... G06F 17/30321; G06F 17/3033; G06F 17/30336; G06F 17/30324; G06F 17/30312; G06F 17/30536; G06F 17/30946; G06F 17/30; G06F 17/30949
See application file for complete search history.

(56) References Cited

U.S. PATENT DOCUMENTS

| 7,702,640 | B1 | 4/2010 | Vermeulen et al. |
| 7,702,683 | B1 * | 4/2010 | Kirshenbaum ... G06F 17/30109 707/718 |
| 7,743,013 | B2 | 6/2010 | Mityagin et al. |
| 8,498,995 | B1 | 7/2013 | Gond et al. |
| 8,560,558 | B2 | 10/2013 | Watanabe et al. |
| 8,977,626 | B2 | 3/2015 | Hess |
| 9,171,153 | B2 | 10/2015 | Jorgensen |
| 2010/0269024 | A1 * | 10/2010 | Hao ...................... H03M 13/13 714/777 |

(Continued)

OTHER PUBLICATIONS

Warren, Claude. GitHub—Claudenw/BloomGraph at 055673cebd37c0df8f4155e61ed78ac8cf5e68e7 [online]. GitHub repository, Mar. 16, 2015 [retrieved on Apr. 4, 2018]. Retrieved from the Internet: <URL: https://github.com/Claudenw/BloomGraph/tree/055673cebd37c0df8f4155e61ed78ac8cf5e68e7> (Year: 2015) (Year: 2015).*

(Continued)

*Primary Examiner* — Sherief Badawi
*Assistant Examiner* — Jesse P Frumkin
(74) *Attorney, Agent, or Firm* — Anthony R. Curro

(57) ABSTRACT

Indexing objects in a datastore, where the objects are characterized by a set of object properties. For objects from a datastore: a Bloom filter for the object properties, based on a predetermined Bloom filter configuration, is created; the Hamming value of the Bloom filter is determined; a binary logarithm of the Bloom filter is calculated; and the Bloom filter, the Hamming value, the binary logarithm, and a representation of the object is stored in the datastore.

17 Claims, 7 Drawing Sheets

SETUP

(56) References Cited

U.S. PATENT DOCUMENTS

| | | |
|---|---|---|
| 2011/0225191 A1 | 9/2011 | Xie et al. |
| 2012/0084287 A1* | 4/2012 | Lakshminarayan ........................ G06F 17/30469 707/737 |
| 2013/0138646 A1 | 5/2013 | Sirer et al. |
| 2013/0226972 A1* | 8/2013 | Kosuru ............... G06F 17/3033 707/802 |
| 2014/0025684 A1* | 1/2014 | Hess ................. G06F 17/30699 707/741 |
| 2015/0039629 A1 | 2/2015 | Theeten et al. |
| 2016/0034486 A1* | 2/2016 | Dageville ......... G06F 17/30132 707/747 |
| 2016/0179893 A1* | 6/2016 | He .................... G06F 17/30495 707/723 |
| 2016/0188623 A1* | 6/2016 | Finlay ............... G06F 17/30153 707/690 |
| 2016/0371339 A1 | 12/2016 | Paddon et al. |
| 2017/0070349 A1* | 3/2017 | Rubin ............... G06F 17/30477 |
| 2017/0228409 A1 | 8/2017 | Darcy et al. |
| 2017/0235775 A1 | 8/2017 | McKenna et al. |
| 2017/0235811 A1 | 8/2017 | McKenna et al. |

OTHER PUBLICATIONS

Warren, Claude. Commits • Claudenw/BloomGraph • GitHub [online]. GitHub respository, 2018 [retrieved on Apr. 4, 2018]. Retrieved from the Internet: <URL: https://github.com/Claudenw/BloomGraph/commits/master> (Year: 2018) (Year: 2018).*

Pending U.S. Appl. No. 15/042,480, filed Feb. 12, 2016, Entitled: "Locating Data in a Set With a Single Index Using Multiple Property Values".

IBM, List of IBM Patents or Patent Applications Treated as Related, Appendix P, dated Sep. 14, 2018, 2 pages.

* cited by examiner

SETUP

INSERT

READ

SCAN

LOCATING DATA IN A SET WITH A SINGLE INDEX USING MULTIPLE PROPERTY VALUES

BACKGROUND

The present invention relates generally to retrieval of records stored in a database, and in particular to an index that facilitates efficient access to specific records.

A relational database is a digital database whose organization is based on the relational model of data. This model organizes data into one or more tables, or relations, of rows and columns, with a unique key for each row. Generally, each entity type described in a database has its own table, the rows representing instances of that type of entity, or objects, and the columns representing values, or properties, attributed to that instance. Because each row in a table has its own unique key, rows in a table can be linked to rows in other tables by storing the unique key of the row to which it should be linked. Data relationships of arbitrary complexity can be represented using this set of concepts. The various software systems used to maintain relational databases are known as Relational Database Management Systems (RDBMS). Virtually all relational database systems use SQL (Structured Query Language) as the language for querying and maintaining the database.

A database index is a data structure that improves the speed of data retrieval operations on a database table at the cost of additional writes and storage space to maintain the index data structure. Indexes are used to quickly locate data in a database table without having to perform a full table scan, which searches every row in the table. Indexes associated with one or more columns of a database table can provide a basis for both rapid random lookups and efficient access of ordered rows.

A Bloom filter is a memory-efficient, probabilistic data structure that supports approximate membership queries in a set. When testing whether an object is a member of a set represented by a Bloom filter, a query may return "definitely not in set" or "may be in set," with a small probability of false positives. A Bloom filter is typically implemented as a bit vector, or array, into which a set of values, representing set elements, is hashed. In general, a Bloom filter may be considered when space is at a premium and the effect of false positives can be mitigated. Due to their efficiency, compact representation, and flexibility in allowing a trade-off between memory requirements and false positive probability, Bloom filters are popular in representing diverse sets of data. For example, they are used in databases, distributed systems, web caching, and other network applications, where systems need to share information about what resources they have. A typical example is using a Bloom filter to reduce expensive disk or network lookups for non-existent objects. If the Bloom filter indicates that the object is not present, then an expensive lookup may be avoided; otherwise, a lookup may be performed, but it may fail a certain percentage of the time.

A Bloom filter index organizes a collection of Bloom filters. Searching a Bloom filter index for a target Bloom filter typically involves comparing indexed Bloom filters with the target Bloom filter to find matches. A standard, but inefficient, technique for locating a target Bloom filter in a collection of Bloom filters is to linearly search a list of all the Bloom filters in the collection for ones that match the target.

SUMMARY

Embodiments of the present invention disclose a computer-implemented method, computer program product, and computer system for indexing objects in a datastore, wherein the objects are characterized by a set of object properties. For one or more objects from a datastore: a Bloom filter for the object properties, based on a predetermined Bloom filter configuration is created; a Hamming value of the Bloom filter is determined; a binary logarithm of the Bloom filter is calculated; and the Bloom filter, the Hamming value, the binary logarithm, and a representation of the object is stored in the datastore.

DETAILED DESCRIPTION

Figure 1:
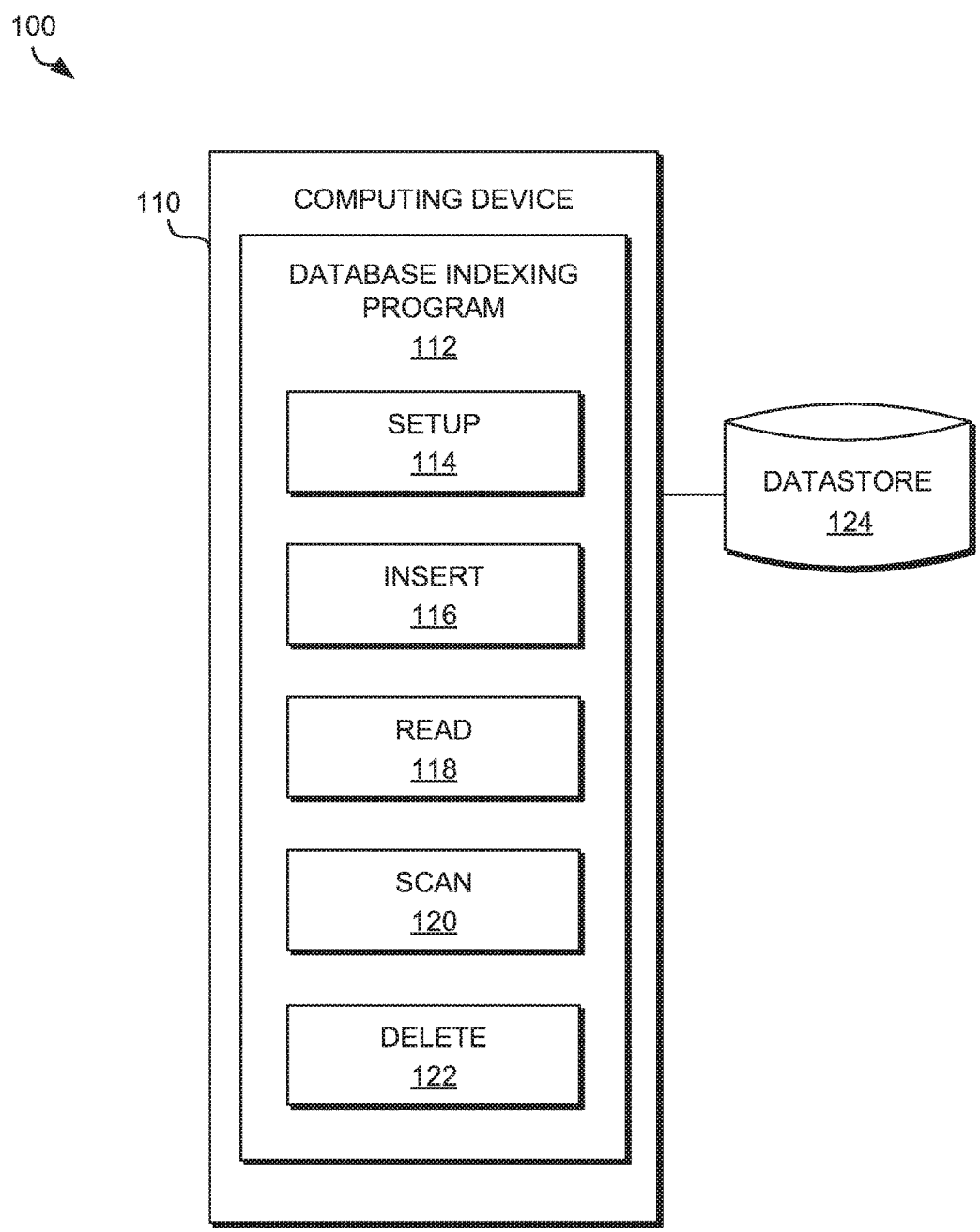
FIG. 1 is a system diagram of a database indexing system, in accordance with an embodiment of the present invention.

In relational databases, multiple indexes may be created to facilitate searching for various combinations of column values, or properties, of the data items, or objects, stored as rows in the database. Each index incurs additional overhead when inserting rows in a database table. Rows in a database are also referred to as records or tuples. In very large data systems, the overhead involved in searching indexes defined for a table may be high enough that a full table scan is preferable. Moreover, for extremely large data systems, index maintenance may become intrusive. In certain cases, removing indexes may actually improve database performance. A solution whereby a single index can readily detect the presence of objects in a database, based on multiple properties would, therefore, be advantageous.

A Bloom filter for a set of n elements uses an array, or bit vector, of m bits, and a collection of k independent hash functions, for a concise representation of the set. Several families of hash functions are suitable for this purpose, for example, the freely available MurmurHash3. The choice of m and k will depend on n and an acceptable false positive probability p, as described below. The size of a Bloom filter is the length m of its bit vector. The k hash functions independently map each of the elements of the set to positions in the bit array, for example to positions with indices 1, . . . , m. Initially, a Bloom filter has all m bits in its array set to 0. To add an element of the set to the Bloom filter, each of the k hash functions maps the element to an array position and the bit in that position is set to 1. After each of the k hash functions has mapped each of the n elements to one of the m bit positions in the Bloom filter array representing the set, to check whether the set contains a specific object, the k hash functions are applied to the object. If any of the resulting k positions in the Bloom filter array contain a 0, the object is definitely not present in the set. If all k positions contain a 1, the set might contain the object, i.e., the 1's might represent a true positive or a false positive. A false positive may occur if the bits related to a given object have been set to 1 by other objects. There is a trade-off between the size of a Bloom filter and the probability of false positives returned by it. The probability of false positives can be lowered by increasing the size of the Bloom filters used.

In what follows, the term Bloom filter will be used to refer both to the data structure that includes both a bit vector, or array, and an associated collection of hash functions, and the array itself, as is common practice. Whenever a collection of Bloom filters is referenced, it is understood that they are all of the same size and use the same collection of hash functions. A particular choice of m, n, and k hash functions is referred to as a Bloom filter configuration.

In practice, once a Bloom filter representing a set has been created, to check whether a specific object is in the set, a target Bloom filter representing the object is created by applying the k hash functions to the object and setting the appropriate bits in the target Bloom filter to 1. The target Bloom filter is then compared to the Bloom filter for the set. A match is found if each 1 bit in the target Bloom filter corresponds to a 1 bit at the same position in the set's Bloom filter. In practice, this means that the result of performing a logical AND operation between the Bloom filter for the set and the target Bloom filter equals the target Bloom filter. A match indicates that the object is in the set, with probability depending on p.

As mentioned above, a Bloom filter is characterized by the number of elements n in the set it represents, the number k of hash functions used, the length m of its bit vector, and the probability p of false positives. It is known that the relationship between these properties is closely approximated by equation (1):

$$p = \left(1 - e^{-\frac{kn}{m}}\right)^k \quad (1)$$

From this equation one may create a Bloom filter with desired properties, for example, by adjusting m and k to give an acceptable probability p of false positives. For example, equation (1) implies that a Bloom filter representing a set of n=3 objects, with a false positive probability of around 1 in 100,000, may be created using a bit vector with m=72 bits and k=17 hash functions. A Bloom filter corresponding to such a set may be created by applying each of the 17 hash functions to the three objects and setting the appropriate bits in the Bloom filter to 1. In practice, a collection of Bloom filters representing such a set will all have the same size and share the same set of hash functions.

For example, one use of Bloom filters is to represent data in selected columns of a database table. Based on the selected columns, a Bloom filter configuration may be defined with appropriate values of m, k, n, and p, using equation (1). The integer n represents the number of column values, or properties, selected. Equation (1) implies, for example, that a Bloom filter representing a row in the table with given values for the three properties, with a false positive probability of around 1 in 100,000, may be created using an array with m=72 bits and k=17 hash functions. A Bloom filter corresponding to such a row is created by applying each of the 17 hash functions to the three properties and setting the appropriate bits in the Bloom filter to 1.

Bloom filters possess various properties that may be utilized to facilitate indexing. One property is that a Bloom filter created from a subset of a set matches a Bloom filter created from the full set. Another is that when matching a target Bloom filter, only Bloom filters with at least as many 1 bits can match. Also, when the Bloom filter is considered as an unsigned integer, only Bloom filters having an array with an equal or higher numerical value can match. For this purpose, the binary logarithm of the numerical value is a convenient substitute for the actual numerical value, which may be extremely large. The binary logarithm may be efficiently computed, for example, using a known recursive approximation technique on the Bloom filter. In what follows, binary log refers to a computed approximation to a binary logarithm.

Embodiments of the present invention are directed to Bloom filters that index data such as rows in a database. A Bloom filter is created for each row, with appropriate bits set in the Bloom filter, each bit position representing a column to be indexed. Associated with the Bloom filter is a Hamming value, the number of bits in the Bloom filter that are set to 1, and an approximation to the binary logarithm of the Bloom filter considered as an unsigned integer. The binary logarithm and the Hamming value provide a lower bound for a database search using the Bloom filters. That is, when searching the database for an object with specified properties, a target, or search, Bloom filter is created that represents the columns to inspect, and the index is searched for matches only among Bloom filters whose Hamming values and binary logarithms are greater than or equal to those of the target Bloom filter. This allows a single index to be used to index multiple data columns, and allows the index to be queried for any combination of exactly matched column values, thus limiting the number of index scans required to find a match.

FIG. 1 is a functional block diagram of a database indexing system 100, in accordance with an embodiment of the present invention. Database indexing system 100 includes computing device 110. Computing device 110 represents the computing environment or platform that hosts database indexing program 112. In various embodiments, computing device 110 may be a laptop computer, netbook computer, personal computer (PC), a desktop computer, or any programmable electronic device capable of hosting database indexing program 112, in accordance with embodiments of the invention. Computing device 110 may include internal and external hardware components, as depicted and described in further detail below with reference to FIG. 7.

In an exemplary embodiment of the invention, computing device 110 includes database indexing program 112 and datastore 124.

Figure 7:
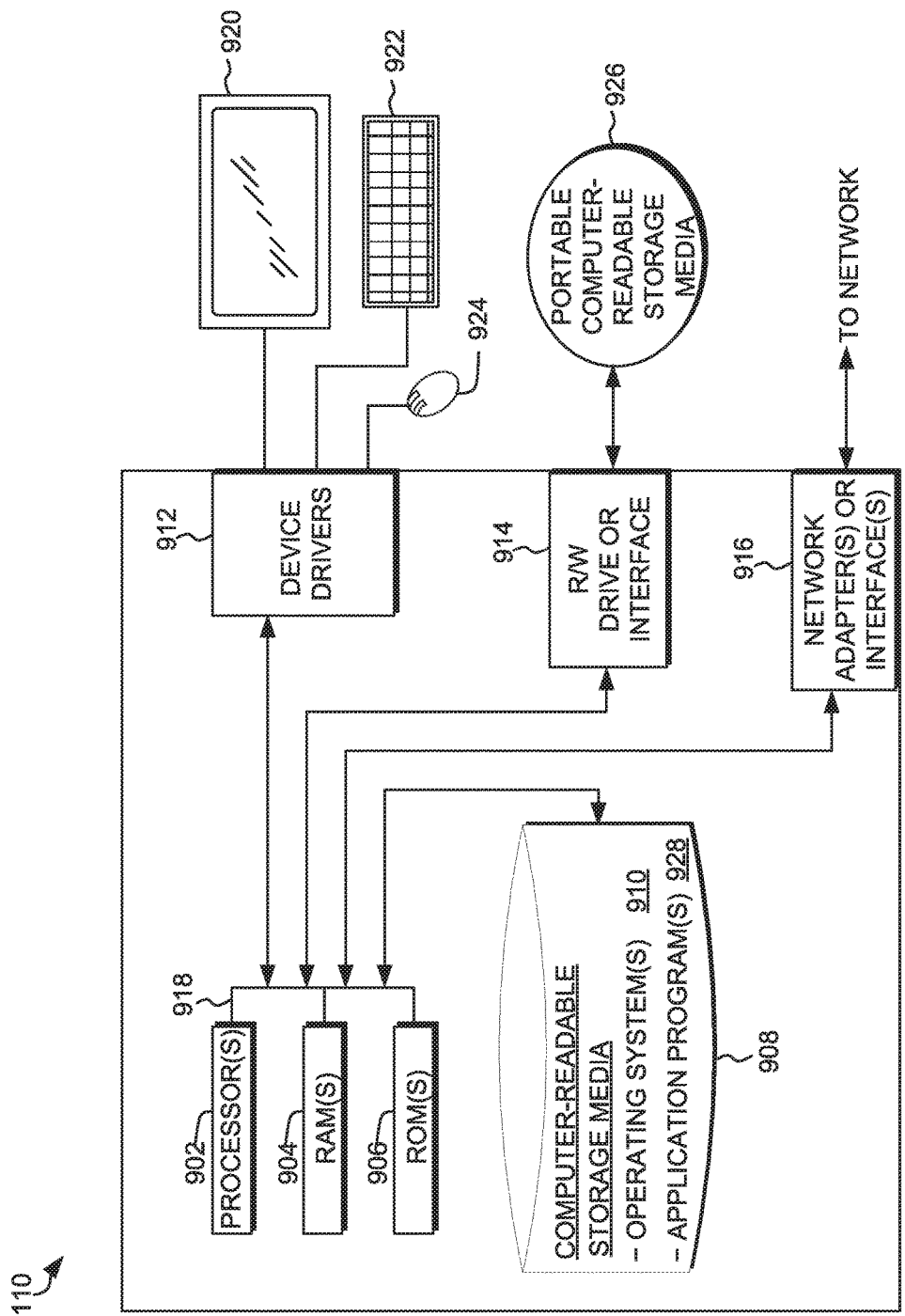
FIG. 7 is a functional block diagram illustrating a data processing environment, in accordance with an embodiment of the present invention.

Datastore 124 represents a store of data, in accordance with an embodiment of the present invention. For example, datastore 124 may include one or more databases. Datastore 124 may also store an index of database objects, as described below. Datastore 124 may reside, for example, on computer readable storage media 908 (FIG. 7).

Database indexing program 112 operates generally to create and maintain an index of Bloom filters representing objects stored as rows in a database table, in accordance with an embodiment of the invention. For each object, a Bloom filter representing all the column values, or properties, that may be searched is created. The object and the Bloom filter may be stored on datastore 124 as part of an index, configured, for example, as a database table. The index includes two further values: the Hamming value of the Bloom filter, and a value based on the binary logarithm of the Bloom filter taken as an unsigned integer. These values identify a subset of the stored Bloom filters, which may be viewed logically as a region of datastore 124 containing the indexed Bloom filters. The region may contain multiple unique Bloom filters. Duplicate Bloom filters may also be present.

When searching the index for an exact match, the Hamming value and the binary logarithm are used to locate a region of datastore 124 that contains the Bloom filter. All Bloom filters within the region are searched and those that match exactly are selected. The matching objects are further filtered to ensure that the desired properties are present. This filtering is necessary because Bloom filters may return false positives.

When looking for multiple objects, i.e., when a non-unique set of properties is selected, a target Bloom filter for the desired column values is created. Regions corresponding to index values that are greater than or equal to the values from the target Bloom filter are scanned for matching Bloom filters. As with the exact search, the matching objects are then filtered to ensure that the desired properties are actually present.

Database indexing program 112 operates generally to facilitate searching for database objects represented as Bloom filters, in accordance with an embodiment of the present invention. The database objects may reside, for example, on datastore 124. Database indexing program 112 may include setup module 114, insert module 116, read module 118, scan module 120, and delete module 122.

Setup module 114 creates a table in a database on datastore 124, in accordance with an exemplary embodiment of the present invention. The table stores a collection of Bloom filters with a common configuration, each representing a database object with specified properties, and serves to index the objects. The table includes columns for the Hamming value of the Bloom filter, the binary log of the Bloom filter, the Bloom filter itself, and for a copy of the object or a representation of the object such as a binary large object (BLOB) representing the object. A BLOB is a collection of binary data of variable length that is stored as a single entity in a database. BLOBs may be, for example, text, an image, an audio or multimedia object, etc. Setup module 114 may index the table, using standard methods of database indexing, by the columns containing the Hamming value and the binary log.

Alternatively, setup module 114 may augment an existing database table with columns for a Bloom filter representing each object in the table, the Hamming value of the Bloom filter, the binary log of the Bloom filter, and the object or a representation of the object, such as a BLOB. Setup module 114 may index the augmented table, using standard methods of database indexing, by the columns containing the Hamming value and the binary log.

In an embodiment of the invention, setup module 114 may select a Bloom filter configuration, based on a predetermined number n of object properties and acceptable false positive probability p. The n object properties may include any object properties that are likely to be searched for. Based on n and p, setup module may use equation (1) to determine a size m of a Bloom filter and a number k of hash functions. Setup module 114 may select a set of k independent hash functions, for example from a predetermined family of hash functions. In other embodiments, setup module 114 may use a predetermined Bloom filter configuration, including values for n, m, and k, and a predetermined set of k independent hash functions.

Insert module 116 operates to insert an object in the table created by setup module 114, in accordance with an embodiment of the present invention. Insert module 116 creates a Bloom filter of size m for the object. Insert module 116 hashes each of the n object properties k times, setting the appropriate bits in the Bloom filter to 1. Insert module 116 determines the Hamming value and the binary logarithm of the Bloom filter. Insert module 116 creates a candidate row for the table that includes the Hamming value, the binary logarithm, the Bloom filter, and a representation of the object, such as a BLOB. Insert module 116 searches the table for an exact match to the row, using an available database find/search instruction. If a match is found, the object is already in the table and no further action is taken. If no match is found, insert module 116 inserts the object in the table using an available database insert instruction.

Read module 118 operates to identify database objects that exactly match specified properties, in accordance with an embodiment of the present invention. In response to a request to identify database objects that exactly match specified properties, read module 118 creates a target Bloom filter of size m for the specified properties and hashes each of the n properties k times, setting the appropriate bits in the Bloom filter to 1. Read module 118 determines the Hamming value and the binary logarithm of the target Bloom filter. Read module 118 searches the table for candidate Bloom filters, which have a Hamming value and a binary logarithm that exactly match the Hamming value and binary logarithm of the target Bloom filter. For this purpose an available database search/find instruction may be used. If no candidates are found, read module 118 may report 'none found'. If one or more candidates are found, read module 118 filters them by verifying that the target Bloom filter matches the candidate Bloom filters. Read module 118 returns the BLOB s (or other object representations) for which the Bloom filters match the target Bloom filter to the calling application, to verify that the properties do, in fact, match the properties of the target Bloom filter, and to eliminate any matches that are false positives. Alternatively, read module 118 may eliminate the false positives.

Scan module 120 operates to identify database objects that have specified properties when multiple property matches are expected, in accordance with an embodiment of the present invention. Scan module 120 creates a target Bloom filter of size m for the specified properties, and hashes each of the n properties k times, setting the appropriate bits in the Bloom filter to 1. Scan module 120 determines the Hamming value and the binary logarithm of the target Bloom filter. Scan module 120 searches the table for candidate Bloom filters, which have Hamming values greater than or equal to the Hamming value of the target Bloom filter and binary logarithms that are greater than or equal to the binary logarithm of the target Bloom filter. For this purpose an available database search/find instruction may be used. If no candidates are found, scan module 120 may report 'none found'. If one or more candidates are found, scan module 120 filters them by verifying that the target Bloom filter matches the candidate Bloom filters. Scan module 120 returns the BLOB s for which the Bloom filters match to the calling application, to verify that the properties do in fact match the properties of the target Bloom filter. This step is necessary because Bloom filter matches may be false positives. Alternatively, scan module 120 may eliminate the false positives. The difference between a scan operation and a read operation is the inequality checks for the Hamming value and the binary logarithm.

For example, Table 1 illustrates an example database table of car properties. The properties are Make, Type, and Color, and each car, identified by a unique ID, is associated with a Bloom filter of size 72, which is displayed in this example in hexadecimal form. The Bloom filters might be, for example, the result of applying 17 hash functions to the three properties, as described above. Two additional columns, one for each of Hamming value and binary log of the Bloom filter, have been added to the database table to facilitate searches, in accordance with the invention. Suppose that the table is to be scanned for the two properties make and type. To scan the table, a search key is constructed, which includes Hamming value, binary log, and Bloom filter, as well as make and type. For example, a search key might be:

28, 69.63427734375, 344C032260487974AD, 'Audi', 'Van'

TABLE 1

CAR TABLE

| ID | HAMMING VALUE | BINARY LOG | BLOOM FILTER (HEX) | MAKE | TYPE | COLOR |
|---|---|---|---|---|---|---|
| 0 | 41 | 69.82421875 | 3A7961E3C17D7C16F7 | 'VW' | 'Van' | 'red' |
| 1 | 34 | 67.859375 | 0EE3A2C19FFD446424 | 'VW' | 'Bug' | 'blue' |
| 2 | 40 | 69.953125 | 3EEBA2E3CF7C7C14A4 | 'VW' | 'Van' | 'blue' |
| 3 | 37 | 69.6494140625 | 34CE83A26E587D74AD | 'Audi' | 'Van' | 'blue' |
| 4 | 36 | 69.6357421875 | 345C432260597976FF | 'Audi' | 'Van' | 'red' |
| 5 | 36 | 68.2939453125 | 14B72B11215D35EF0F | 'Audi' | 'Sedan' | 'white' |
| 6 | 31 | 66.208984375 | 04D6A3902E5835670D | 'Audi' | 'Sedan' | 'blue' |

Audi is a registered trademark of AUDI AG. VW is a registered trademark of Volkswagen AG. The result of the scan operation includes all rows in Table 1 with a Hamming value greater than or equal to the key Hamming value, 28, and a binary log greater than or equal to the search key binary log, 69.63427734375. In this example, these are the rows with IDs 0, 2, 3, and 4, as shown in Table 2:

TABLE 2

CAR TABLE SCAN RESULTS

| ID | HAMMING VALUE | BINARY LOG | BLOOM FILTER (HEX) | MAKE | TYPE | COLOR |
|---|---|---|---|---|---|---|
| 0 | 41 | 69.82421875 | 3A7961E3C17D7C16F7 | 'VW' | 'Van' | 'red' |
| 2 | 40 | 69.953125 | 3EEBA2E3CF7C7C14A4 | 'VW' | 'Van' | 'blue' |
| 3 | 37 | 69.6494140625 | 34CE83A26E587D74AD | 'Audi' | 'Van' | 'blue' |
| 4 | 36 | 69.6357421875 | 345C432260597976FF | 'Audi' | 'Van' | 'red' |

After the results are filtered by Bloom filter matching via an AND operation, only the rows with IDs 3 and 4 remain.

Delete module 122 operates to delete database objects that have specified properties, in accordance with an embodiment of the present invention. In response to a request to delete database objects that exactly match specified properties, delete module 122 creates a target Bloom filter of size m for the specified properties, hashes each of the n properties k times, and sets the appropriate bits in the target Bloom filter to 1. Delete module 122 determines the Hamming value and the binary logarithm of the target Bloom filter. Delete module 122 creates a candidate row for the table, including the Hamming value, the binary logarithm, the Bloom filter, and the object representation, for example, a BLOB. Delete module 122 searches the table for exact matches to the candidate row. For this purpose an available database search/find instruction may be used. If no candidate is found, the object was not present in the table and delete module 122 may report 'none found'. If one or more matches are found, delete module 122 removes the objects from the table.

For databases that do not support numeric indexes, the Hamming value may be a zero-prefixed string with the length of the string being the length m expressed as a string, and the binary logarithm may be expressed as a concatenation of the position of the highest 1 bit in the Bloom filter, expressed with leading zeros as with the Hamming value, and a fixed number of the next highest bits similarly expressed. In general, five bits is sufficient.

Implementation has been described for relational databases, though using user-defined functions to perform the bitmap scanning on the database rather than on the client is advisable. As will be apparent to skilled practitioners, implementation for databases other than relational databases is also straightforward, for example, using custom filters. Moreover, the same basic approach will work as well, with proper structuring, on a naked file system.

Figure 2:
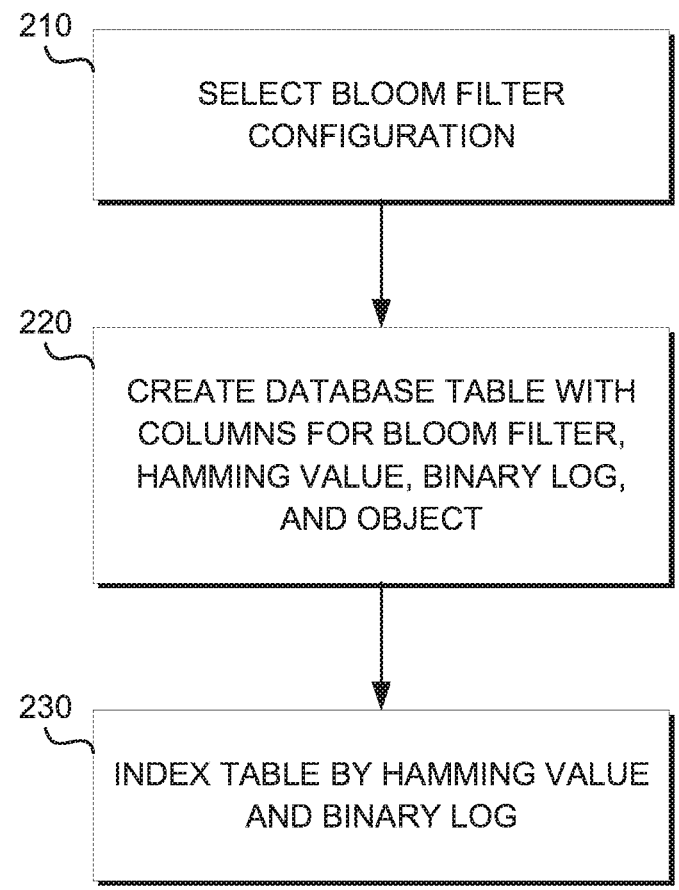
FIG. 2 is a flowchart depicting operational steps of a database indexing program, in accordance with an embodiment of the present invention.

FIG. 2 is a flowchart depicting operational steps of setup module 114 in database indexing program 112, in accordance with an exemplary embodiment of the invention. Setup module 114 selects or receives a Bloom filter configuration (step 210). Setup module 114 creates a database table with columns for a Bloom filter, the Hamming value of the Bloom filter, a binary log of the Bloom filter, and a representation of a database object, for example a BLOB (step 220). Setup module 114 indexes the database table according to the columns with Hamming value and binary log (step 230).

Figure 3:
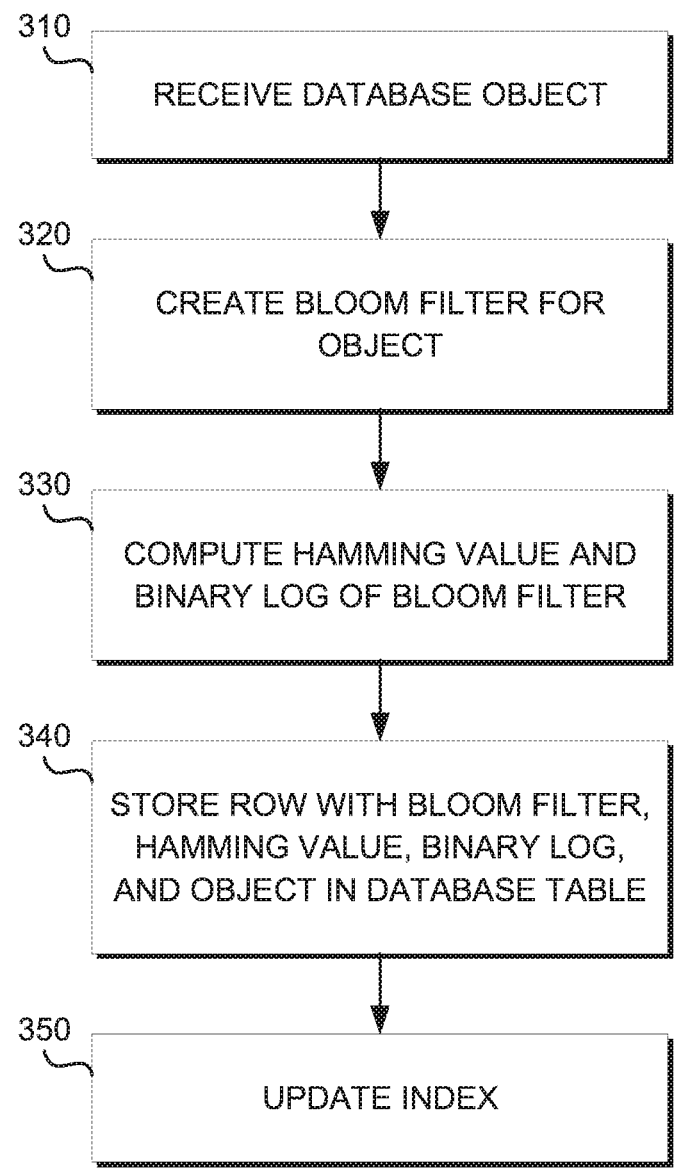
FIG. 3 is another flowchart depicting operational steps of a database indexing program, in accordance with an embodiment of the present invention.

FIG. 3 is a flowchart depicting operational steps of insert module 116 in database indexing program 112, in accordance with an exemplary embodiment of the invention. Insert module 116 receives a database object (step 310). Insert module 116 creates a Bloom filter for the object (step 320). Insert module 116 computes the Hamming value and a binary log of the Bloom filter (step 330). Insert module 116 inserts a row with the Bloom filter, Hamming value, binary log, and a representation of the object in the database table created by setup module 114 (step 340). Insert module 116 updates the index created by setup module 114 (step 350).

Figure 4:
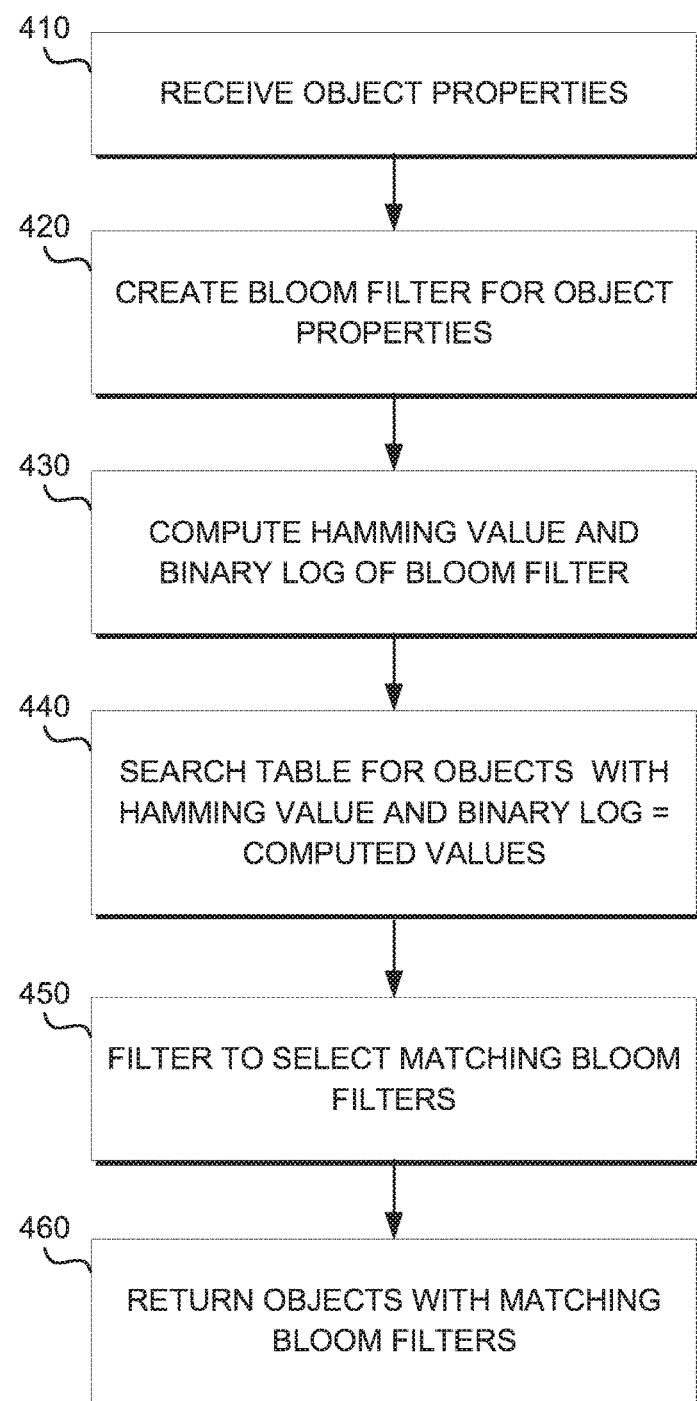
FIG. 4 is another flowchart depicting operational steps of a database indexing program, in accordance with an embodiment of the present invention.

FIG. 4 is a flowchart depicting operational steps of read module 118 in database indexing program 112, in accordance with an exemplary embodiment of the invention. Read module 118 receives a set of object properties (step 410). Read module 118 creates a Bloom filter for the object properties (step 420). Read module 118 computes the Hamming value and a binary log of the Bloom filter (step 430). Read module 118 searches the database table created by setup module 114 for rows that have a Hamming value equal to the computed Hamming value and a binary log equal to the computed binary log (step 440). Read module 118 filters the rows found to select those with a Bloom filter that matches the target Bloom filter (step 450). Read module 118 returns any objects that have matching Bloom filters (step 460).

Figure 5:
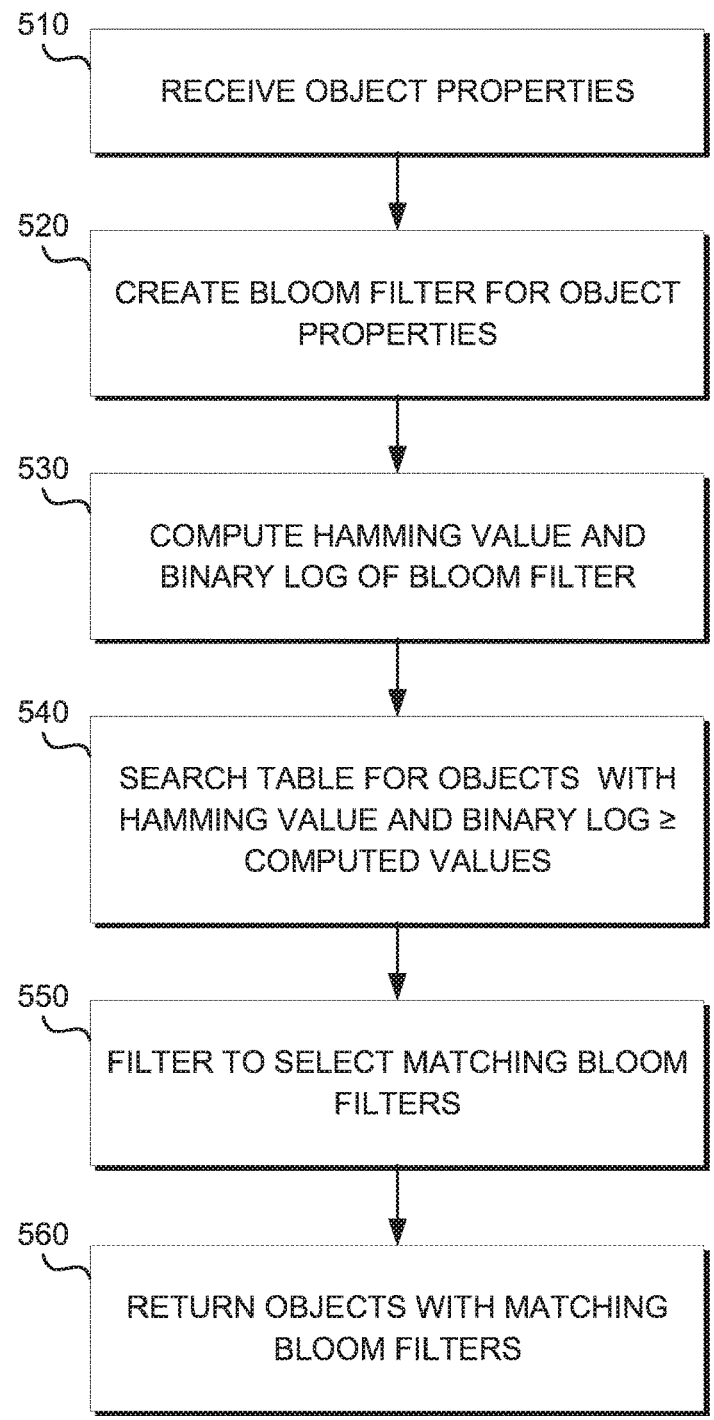
FIG. 5 is another flowchart depicting operational steps of a database indexing program, in accordance with an embodiment of the present invention.

FIG. 5 is a flowchart depicting operational steps of scan module 120 in database indexing program 112, in accordance with an exemplary embodiment of the invention. Scan module 120 receives a set of object properties (step 510). Scan module 120 creates a Bloom filter for the object properties (step 520). Scan module 120 computes the Hamming value and a binary log of the Bloom filter (step 530). Scan module 120 searches the database table created by setup module 114 for rows that have a Hamming value greater than or equal to the computed Hamming value and a binary log greater than or equal to the computed binary log (step 540). Scan module 120 filters the rows found to select those with a Bloom filter that matches the target Bloom filter (step 550). Scan module 120 returns any objects that have matching Bloom filters (step 560).

Figure 6:
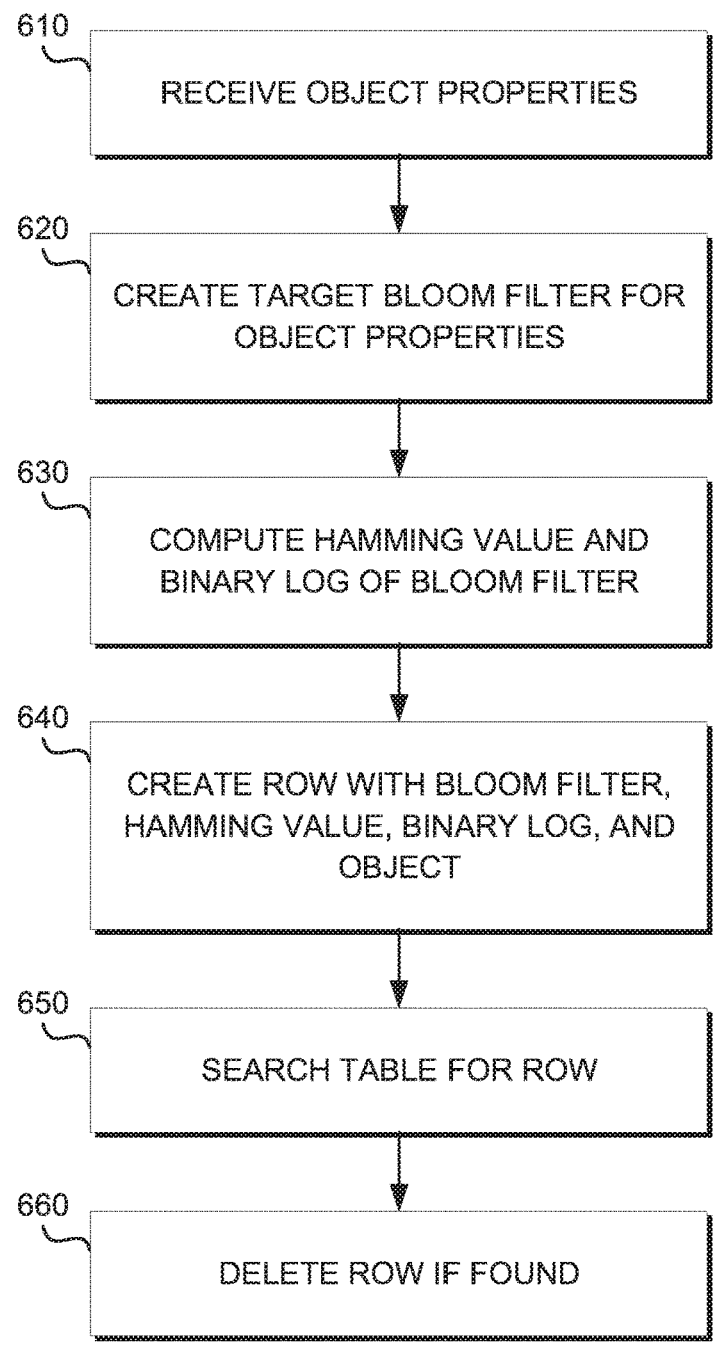
FIG. 6 is another flowchart depicting operational steps of a database indexing program, in accordance with an embodiment of the present invention.

FIG. 6 is a flowchart depicting operational steps of delete module 122 in database indexing program 112, in accordance with an exemplary embodiment of the invention. Delete module 122 receives a set of object properties (step 610). Delete module 122 creates a Bloom filter for the object properties (step 620). Delete module 122 computes the Hamming value and a binary log of the Bloom filter (step 630). Delete module 122 creates a candidate row with the target Bloom filter, the Hamming value, the binary log, and the object (step 640). Delete module 122 searches the database table created by setup module 114 for rows that exactly match the candidate row (step 650). Delete module 122 deletes any rows that match (step 660).

FIG. 7 depicts a block diagram 900 of components of computing device 110 (FIG. 1), in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, database indexing program 112 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on client computing devices and/or computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for indexing objects in a datastore, wherein the objects are characterized by a set of object properties, the method comprising:

for one or more objects from a datastore:
creating, by a computer, a Bloom filter for the object properties, based on a predetermined Bloom filter configuration;
determining, by the computer, a Hamming value of the Bloom filter;
calculating, by the computer, a binary logarithm of the Bloom filter;
storing, by the computer, the Bloom filter, the Hamming value, the binary logarithm, and a representation of the object in the datastore; and
indexing, by the computer, the objects by Hamming value and binary logarithm, wherein the datastore is a relational database,
wherein the objects correspond to rows in a database table, and
wherein the Bloom filter, the Hamming value, the binary logarithm, and the representation of the object in the datastore correspond to columns in the database table.

2. A method in accordance with claim 1, further comprising:
providing, by the computer, a set of objects from the datastore in response to a request to search the datastore for objects with specified properties.

3. A method in accordance with claim 2, wherein the providing comprises:
creating, by a computer, a search Bloom filter for the object properties, based on the predetermined Bloom filter configuration;
determining, by the computer, a Hamming value of the search Bloom filter;
calculating, by the computer, a binary logarithm of the search Bloom filter;
identifying, by the computer, objects in the datastore which have respective Hamming values equal to the Hamming value of the search Bloom filter and respective binary logarithms equal to the binary logarithm of the search Bloom filter;
identifying, by the computer, from the identified objects, ones whose Bloom filters match the search Bloom filter, wherein a Bloom filter matches the search Bloom filter if each 1 bit in the search Bloom filter corresponds to a 1 bit at the same position in the Bloom filter; and
eliminating, by the computer, from the identified objects whose Bloom filters match the search Bloom filter, false positives.

4. A method in accordance with claim 1, further comprising:
in response to receiving a request to delete objects in the datastore with specified properties:
creating, by a computer, a search Bloom filter for the object properties, based on the predetermined Bloom filter configuration;
determining, by the computer, a Hamming value of the search Bloom filter;
calculating, by the computer, a binary logarithm of the search Bloom filter;
identifying, by the computer, objects in the datastore which have respective Hamming values equal to the Hamming value of the search Bloom filter and respective binary logarithms equal to the binary logarithm of the search Bloom filter;
identifying, by the computer, from the identified objects, ones whose Bloom filters match the search Bloom filter, wherein a Bloom filter matches the search Bloom filter if each 1 bit in the search Bloom filter corresponds to a 1 bit at the same position in the Bloom filter;
eliminating, by the computer, from the identified objects whose Bloom filters match the search Bloom filter, false positives; and
deleting, by the computer, objects from the identified objects whose Bloom filters match the search Bloom filter any that are not false positives.

5. A method in accordance with claim 1,
wherein the predetermined Bloom filter configuration is selected based on a predetermined number of object properties and on a predetermined false positive probability.

6. A method in accordance with claim 1, wherein the representation of the object is one of:
a copy of the object, a binary large object, or a reference to the object.

7. A computer system for indexing objects in a datastore, wherein the objects are characterized by a set of object properties, the computer system comprising:
one or more computer processors, one or more non-transitory computer-readable storage media, and program instructions stored on one or more of the computer-readable storage media for execution by at least one of the one or more processors, the program instructions comprising:
program instructions, for one or more objects from a datastore, to:
create a Bloom filter for the object properties, based on a predetermined Bloom filter configuration;
determine a Hamming value of the Bloom filter;
calculate a binary logarithm of the Bloom filter;
store the Bloom filter, the Hamming value, the binary logarithm, and a representation of the object in the datastore; and
index the objects by Hamming value and binary logarithm,
wherein the datastore is a relational database,
wherein the objects correspond to rows in a database table, and
wherein the Bloom filter, the Hamming value, the binary logarithm, and the representation of the object in the datastore correspond to columns in the database table.

8. A computer system in accordance with claim 7, further comprising:
program instructions to provide a set of objects from the datastore in response to a request to search the datastore for objects with specified properties.

9. A computer system in accordance with claim 8, wherein program instructions to provide comprise:
program instructions to create a search Bloom filter for the object properties, based on the predetermined Bloom filter configuration;
program instructions to determine a Hamming value of the search Bloom filter;
program instructions to calculate a binary logarithm of the search Bloom filter;
program instructions to identify objects in the datastore which have respective Hamming values equal to the Hamming value of the search Bloom filter and respective binary logarithms equal to the binary logarithm of the search Bloom filter;
program instructions to identify from the identified objects, ones whose Bloom filters match the search Bloom filter, wherein a Bloom filter matches the search Bloom filter if each 1 bit in the search Bloom filter corresponds to a 1 bit at the same position in the Bloom filter; and
program instructions to eliminate from the identified objects whose Bloom filters match the search Bloom filter, false positives.

10. A computer system in accordance with claim 7, further comprising:
in response to receiving a request to delete objects in the datastore with specified properties:
program instructions to create a search Bloom filter for the object properties, based on the predetermined Bloom filter configuration;

program instructions to determine a Hamming value of the search Bloom filter;

program instructions to calculate a binary logarithm of the search Bloom filter;

program instructions to identify objects in the datastore which have respective Hamming values equal to the Hamming value of the search Bloom filter and respective binary logarithms equal to the binary logarithm of the search Bloom filter;

program instructions to identify from the identified objects, ones whose Bloom filters match the search Bloom filter, wherein a Bloom filter matches the search Bloom filter if each 1 bit in the search Bloom filter corresponds to a 1 bit at the same position in the Bloom filter;

program instructions to eliminate, from the identified objects whose Bloom filters match the search Bloom filter, false positives; and program instructions to delete objects, from the identified objects whose Bloom filters match the search Bloom filter, any that are not false positives.

11. A computer system in accordance with claim 7, wherein the predetermined Bloom filter configuration is selected based on a predetermined number of object properties and on a predetermined false positive probability.

12. A computer system in accordance with claim 7, wherein the representation of the object is one of:
a copy of the object, a binary large object, or a reference to the object.

13. A computer program product for indexing objects in a datastore, wherein the objects are characterized by a set of object properties, the computer program product comprising:
one or more non-transitory computer-readable storage media and program instructions stored on the one or more computer-readable storage media, the program instructions comprising:
program instructions, for one or more objects from a datastore, to:
create a Bloom filter for the object properties, based on a predetermined Bloom filter configuration;
determine a Hamming value of the Bloom filter;
calculate a binary logarithm of the Bloom filter;
store the Bloom filter, the Hamming value, the binary logarithm, and a representation of the object in the datastore; and
index the objects by Hamming value and binary logarithm,
wherein the datastore is a relational database,
wherein the objects correspond to rows in a database table, and
wherein the Bloom filter, the Hamming value, the binary logarithm, and the representation of the object in the datastore correspond to columns in the database table.

14. A computer program product in accordance with claim 13, further comprising:
program instructions to provide a set of objects from the datastore in response to a request to search the datastore for objects with specified properties.

15. A computer program product in accordance with claim 14, wherein program instructions to provide comprise:
program instructions to create a search Bloom filter for the object properties, based on the predetermined Bloom filter configuration;
program instructions to determine a Hamming value of the search Bloom filter;
program instructions to calculate a binary logarithm of the search Bloom filter;
program instructions to identify objects in the datastore which have respective Hamming values equal to the Hamming value of the search Bloom filter and respective binary logarithms equal to the binary logarithm of the search Bloom filter;
program instructions to identify from the identified objects, ones whose Bloom filters match the search Bloom filter, wherein a Bloom filter matches the search Bloom filter if each 1 bit in the search Bloom filter corresponds to a 1 bit at the same position in the Bloom filter; and
program instructions to eliminate from the identified objects whose Bloom filters match the search Bloom filter, false positives.

16. A computer program product in accordance with claim 13, further comprising:
in response to receiving a request to delete objects in the datastore with specified properties:
program instructions to create a search Bloom filter for the object properties, based on the predetermined Bloom filter configuration;
program instructions to determine a Hamming value of the search Bloom filter;
program instructions to calculate a binary logarithm of the search Bloom filter;
program instructions to identify objects in the datastore which have respective Hamming values equal to the Hamming value of the search Bloom filter and respective binary logarithms equal to the binary logarithm of the search Bloom filter;
program instructions to identify from the identified objects, ones whose Bloom filters match the search Bloom filter, wherein a Bloom filter matches the search Bloom filter if each 1 bit in the search Bloom filter corresponds to a 1 bit at the same position in the Bloom filter;
program instructions to eliminate, from the identified objects whose Bloom filters match the search Bloom filter, false positives; and
program instructions to delete objects, from the identified objects whose Bloom filters match the search Bloom filter, any that are not false positives.

17. A computer program product in accordance with claim 13,
wherein the predetermined Bloom filter configuration is selected based on a predetermined number of object properties and on a predetermined false positive probability.

* * * * *